United States Patent
Morgan

(10) Patent No.: US 11,085,396 B2
(45) Date of Patent: Aug. 10, 2021

(54) LOCKING SYSTEM AND TORQUE LIMITER FOR AN ELECTRICALLY ACTUATED THRUST REVERSER

(71) Applicant: Goodrich Actuation Systems Limited, Solihull (GB)

(72) Inventor: Antony Morgan, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 198 days.

(21) Appl. No.: 16/021,069

(22) Filed: Jun. 28, 2018

(65) Prior Publication Data

US 2019/0093601 A1     Mar. 28, 2019

(30) Foreign Application Priority Data

Sep. 28, 2017   (EP) ..................................... 17275151

(51) Int. Cl.
    *F02K 1/76*     (2006.01)
(52) U.S. Cl.
    CPC .............. *F02K 1/766* (2013.01); *F02K 1/763* (2013.01); *F05D 2230/72* (2013.01)
(58) Field of Classification Search
    CPC ...... F02K 1/766; F02K 1/763; F16H 25/2454; F15B 15/26
    See application file for complete search history.

(56) References Cited

U.S. PATENT DOCUMENTS

| 9,217,390 B2 | 12/2015 | Lucas et al. | |
|---|---|---|---|
| 2005/0001095 A1* | 1/2005 | Christensen | F02K 1/766 244/110 B |
| 2010/0229528 A1* | 9/2010 | Ramlaoui | F02K 1/30 60/226.2 |
| 2016/0230703 A1 | 8/2016 | Tisseau et al. | |

FOREIGN PATENT DOCUMENTS

EP        0506277 A1     9/1992

OTHER PUBLICATIONS

Extended European Search Report for International Application No. 17275151.3 dated Apr. 5, 2018, 11 pages.
European Search Report for Application No. 17275151.3-1007, dated Jul. 4, 2018, 10 pages.

\* cited by examiner

*Primary Examiner* — Andrew H Nguyen
(74) *Attorney, Agent, or Firm* — Cantor Colburn LLP

(57) ABSTRACT

A thrust reverser is described that comprises a new type of locking means for locking an actuator in position so that maintenance can be performed on the machine. The locking means comprises a removable locking device for preventing movement of an actuator. The locking means may also function in one configuration as an end cap. An actuator is also described comprising a removable torque limiting device for limiting torque of the actuator.

8 Claims, 5 Drawing Sheets

LOCKING SYSTEM AND TORQUE LIMITER FOR AN ELECTRICALLY ACTUATED THRUST REVERSER

FOREIGN PRIORITY

This application claims priority to European Patent Application No. 17275151.3 filed Sep. 28, 2017, the entire contents of which is incorporated herein by reference.

TECHNICAL FIELD

The examples described herein relate to electric thrust reversers such as those used in aircraft. In particular, the examples described herein relate to means and methods for locking the actuators of and further to limiting the torque of such electric thrust reversers.

BACKGROUND

Electric thrust reversers are utilized in aircraft to change the direction of thrust of the aircraft engine, (i.e. so that the thrust is directed forward, rather than backward) so as to decelerate the aircraft. These are used to slow the aircraft down upon landing.

Known system thrust reversers that are actuated electrically often use a number of ballscrews operating in parallel from a motor. The actuators operate collectively via a number of interconnecting shafts. Traditionally, during maintenance, the ballscrews are operated via a manual drive unit and with an intermediate locking device which is permanently mounted within the transmission.

SUMMARY

An actuator for use in a thrust reverser is described herein, comprising a removable locking device for preventing movement of said actuator. The actuator comprises a drive spline for moving said actuator, said drive spline having a hollow shaft with an inner surface. The locking device comprises a first end and a second end with a shaft having an outer surface extending between said first and second ends. The inner surface of said hollow shaft of said drive spline is sized and shaped to receive and mate with said outer surface of said shaft of said removable locking device to thereby prevent movement of said thrust reverser and therefore also said actuator when said shaft of said locking means is positioned within said hollow shaft of said spline.

In any of the examples described herein, the inner surface of said drive spline hollow shaft and said outer surface of said shaft of said locking device may be correspondingly contoured to provide a matching interface between the two shafts.

In any of the examples described herein, the inner surface of said drive spline hollow shaft and said outer surface of said shaft of said locking device may comprise correspondingly shaped and sized elongated ridges.

In any of the examples described herein, said removable locking device may have a greater diameter D1 at said second end than a diameter D2 at said first end. The second end may act to seal the entrance to said hollow shaft of said drive spline when said second end is positioned over the entrance to said hollow shaft and when said shaft of said locking device is not positioned within said hollow shaft.

In some examples, the end cap and the locking means are reversible in that in a first configuration, the first end of the locking means may be used to lock the actuator, and in a second configuration, the opposite, second end of the locking means comprises an end cap.

In some examples, the locking means does not comprise an end cap at its opposite end.

In some examples, the end cap does not comprise a locking means at its opposite end.

An actuator for use in a thrust reverser is also described that comprises a removable torque limiting device for limiting torque to said actuator and therefore also limiting torque to the actuator. The actuator comprises a drive spline for moving said actuator, having a hollow shaft with an inner surface; and said torque limiting device having a shaft extending therefrom, said shaft having an outer surface; and wherein said hollow shaft of said drive spline is sized and shaped to receive and mate with said shaft of said removable torque limiting device to thereby limit torque of said actuator.

In any of the examples described herein, said inner surface of said drive spline hollow shaft and said outer surface of said shaft of said torque limiting device may be correspondingly contoured to provide a matching interface between the two shafts.

In any of the examples described herein, the inner surface of said drive spline hollow shaft and said outer surface of said shaft of said torque limiting device may comprise correspondingly shaped and sized elongated ridges.

A method for locking and preventing movement of an actuator that may be connected to a thrust reverser is also described herein. The actuator comprises a drive spline for moving said actuator, said drive spline having a hollow shaft with an inner surface; and said method comprising the steps of: providing a removable locking device, said locking device comprising a first end and a second end with a shaft having an outer surface extending between said first and second ends, and inserting said shaft at said first end of the device into said hollow shaft of said drive spline; said hollow shaft being sized and shaped to receive and mate with said shaft of said removable locking device to thereby prevent movement of said actuator.

A method for limiting torque of an actuator in a thrust reverser is also described herein, said actuator comprising a drive spline for moving said actuator, said drive spline having a hollow shaft with an inner surface; and said method comprising the steps of: providing a removable torque limiting device comprising a shaft extending therefrom, said shaft having an outer surface, and the method further comprising the step of inserting said shaft at said torque limiting device into said hollow shaft of said drive spline; said hollow shaft being sized and shaped to receive and mate with said shaft of said torque limiting device to thereby limit torque of said actuator.

DETAILED DESCRIPTION

Figure 1:
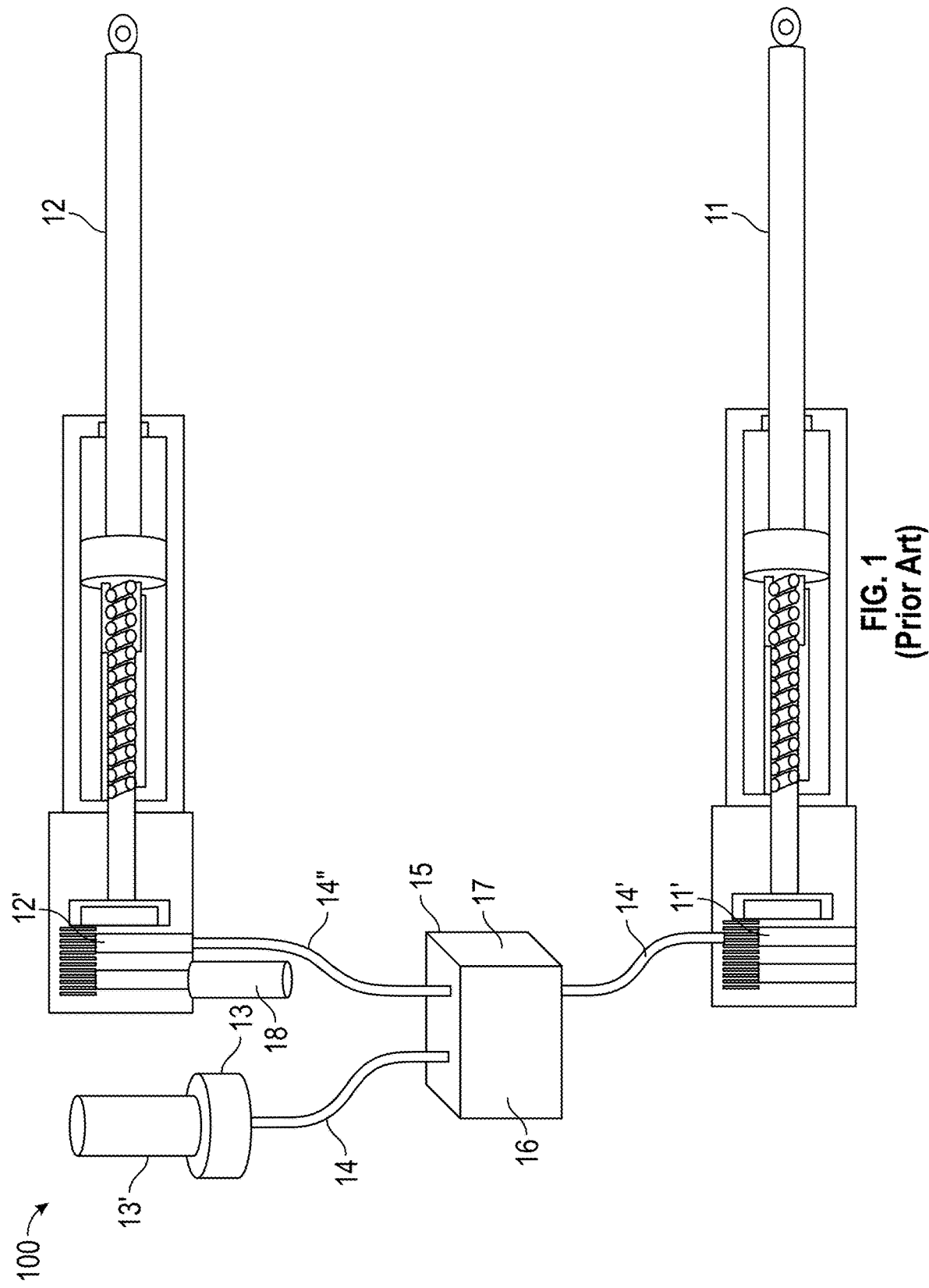
FIG. 1 depicts a known example of half of a single nacelle that may be used in an aircraft.

FIG. 1 depicts half of a single nacelle, as is known in the art and that may be used in an aircraft. The nacelle contains an electrically actuated thrust reverser that comprises first 11 and second 12 actuators. The thrust reverser also comprises a motor 13 which may further comprise a power off brake 13'. This power off brake may be either manually or electrically released. The motor 13 is connected via a first flexible drive shaft 14 to a dual gear set 15. The dual gear set 15 further comprises means for locking the thrust reverser mid-stroke. This is a requirement when the aircraft is undergoing maintenance, for safety reasons. Usually, the means for locking the thrust reverser comprises a pin (not shown) which physically prevents the gears in the dual gear set 15 from moving. The drive gear set 15 may further comprise a manual drive unit 17 which acts as a torque limiting device.

Figure 5:
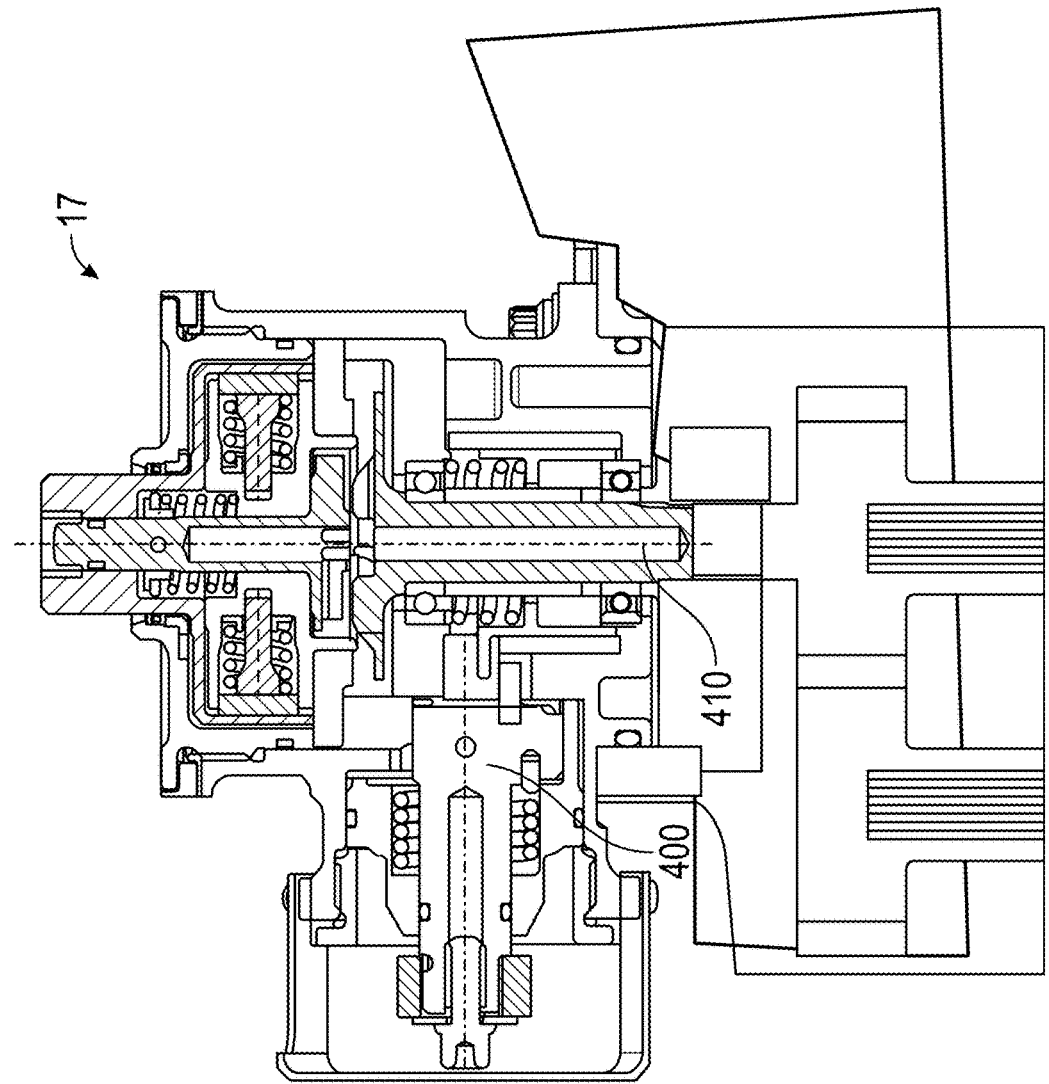
FIG. 5 depicts the internal workings of a known manual drive unit as may be used with the example shown in FIG. 1.

The internal workings of a known manual drive unit 17 with a mid-stroke lever lock are more clearly shown in FIG. 5. The manual drive unit 17 may comprise a rotary cam 400 which is indirectly connected to spring loaded pistons 410. In use, movement of the cam 400 allows the two spring loaded pistons 410 (only one shown) to lift into slots within the shaft of the piston 410. Although the piston 410 is permanently geared to the TRAS transmission, this stops movement of the transmission and locks the thrust reverser and thereby also the actuators in place and prevents them from moving.

A second flexible drive shaft 14' connects the dual gear set 15 to the drive spline(s) 11' of a first actuator 11, and a third flexible drive shaft 14" connects the dual gear set 15 to the drive spline(s) 12' of a second actuator 12. These flexible drive shafts 14, 14', 14" allow rotation of the drive shafts and further enable the shafts to be flexibly installed within the nacelle and relative to the other components of the thrust reverser 100. Further components as are known in the art may further be present, such as means for providing position feedback 18, e.g. a rotary variable differential transformer (RVDT).

The manual drive unit 17 and intermediate locking device 16 are therefore permanently mounted within the transmission of this known system. Unfortunately, however, this results in disadvantages since it leads to a greater mass, increased cost as well as an increase in system inertia.

The examples described herein and below, with reference to FIGS. 2 to 3 therefore aim to overcome such disadvantages with known devices.

In particular, the examples of improved thrust reversers described herein use a simplified means of providing both a torque limiting/controlling function as well as a locking functionality, which in turn results in the same functionality as known devices, but which are cheaper, lighter and provide no increase in inertia to the system.

Figure 2:
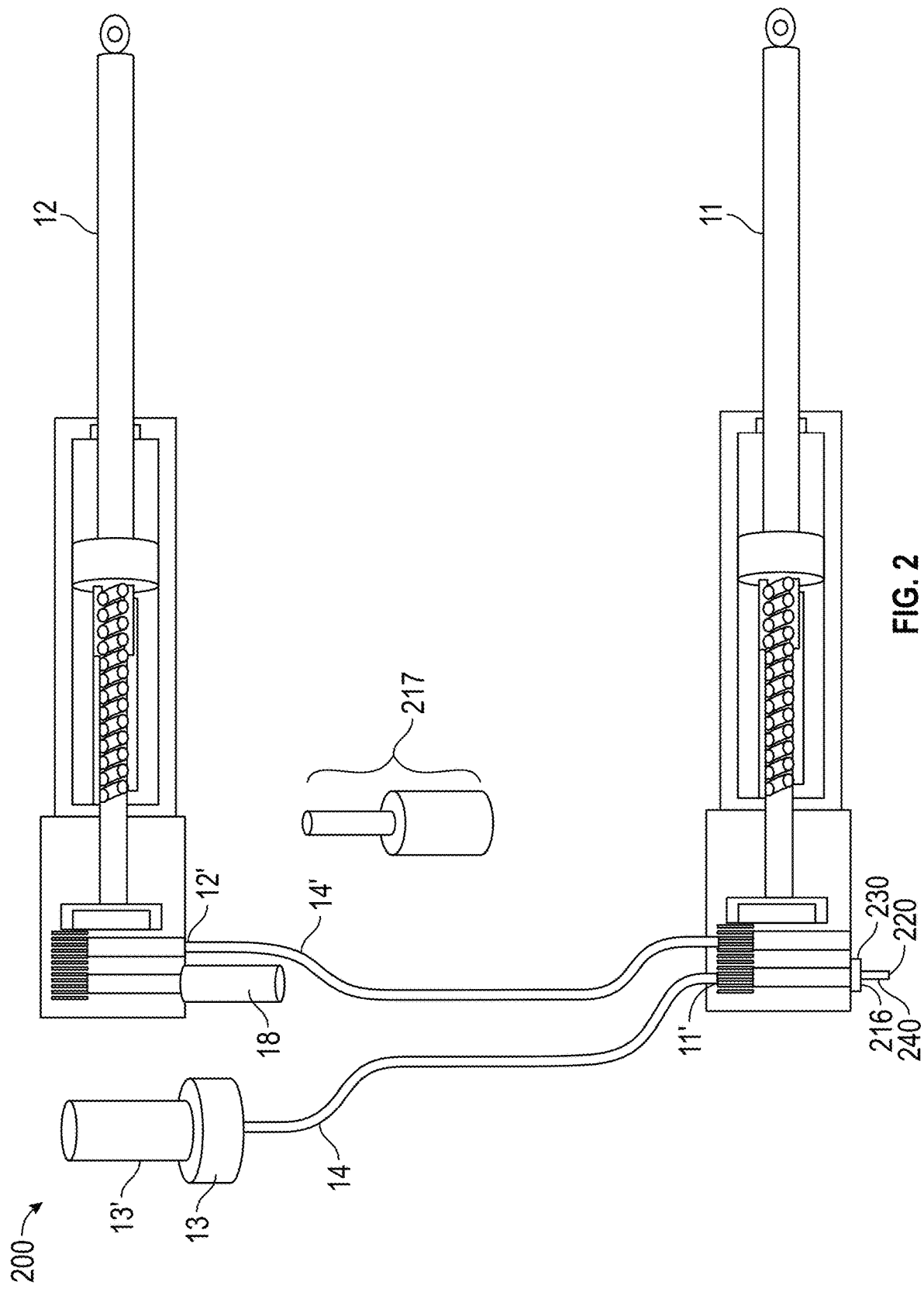
FIG. 2 depicts a new type of thrust reverser and new means of locking the thrust reverser as well as limiting the torque of the thrust reverser

An example of an improved thrust reverser 200 and means for locking 216 a thrust reverser 200 is shown in FIG. 2. In this figure, the same reference numerals have been used to represent the same features as shown in FIG. 1. This example differs from that shown in FIG. 1, however, in that the means 216 for locking the thrust reverser 200 in this example is not permanently mounted within the transmission and the manual drive unit 217 of this example is also not permanently mounted in the transmission.

As can be seen in FIG. 2, the motor 13, (which in some examples may contain a power off brake 13' which may be either manually or electrically released) may be connected via a first flexible drive shaft 14 to a drive spline(s) 11' of a first actuator 11. A second flexible drive shaft 14' may then connect the first actuator 11 to the second actuator 12.

In some examples, the new thrust reverser 200 may also contain further features that are often found in such devices, such as RVDTs 18 etc.

This new example of an electrically actuated thrust reverser 200 may further comprise means for locking 216 the actuators 11, 12, to prevent movement of the actuators 11, 12 during maintenance, as described above. In some examples this means for locking 216 may further be reversible and additionally act as an end cap that fits over the drive spline 11' of the thrust reverser 200 in one configuration such as that shown in FIG. 2.

Figure 3:
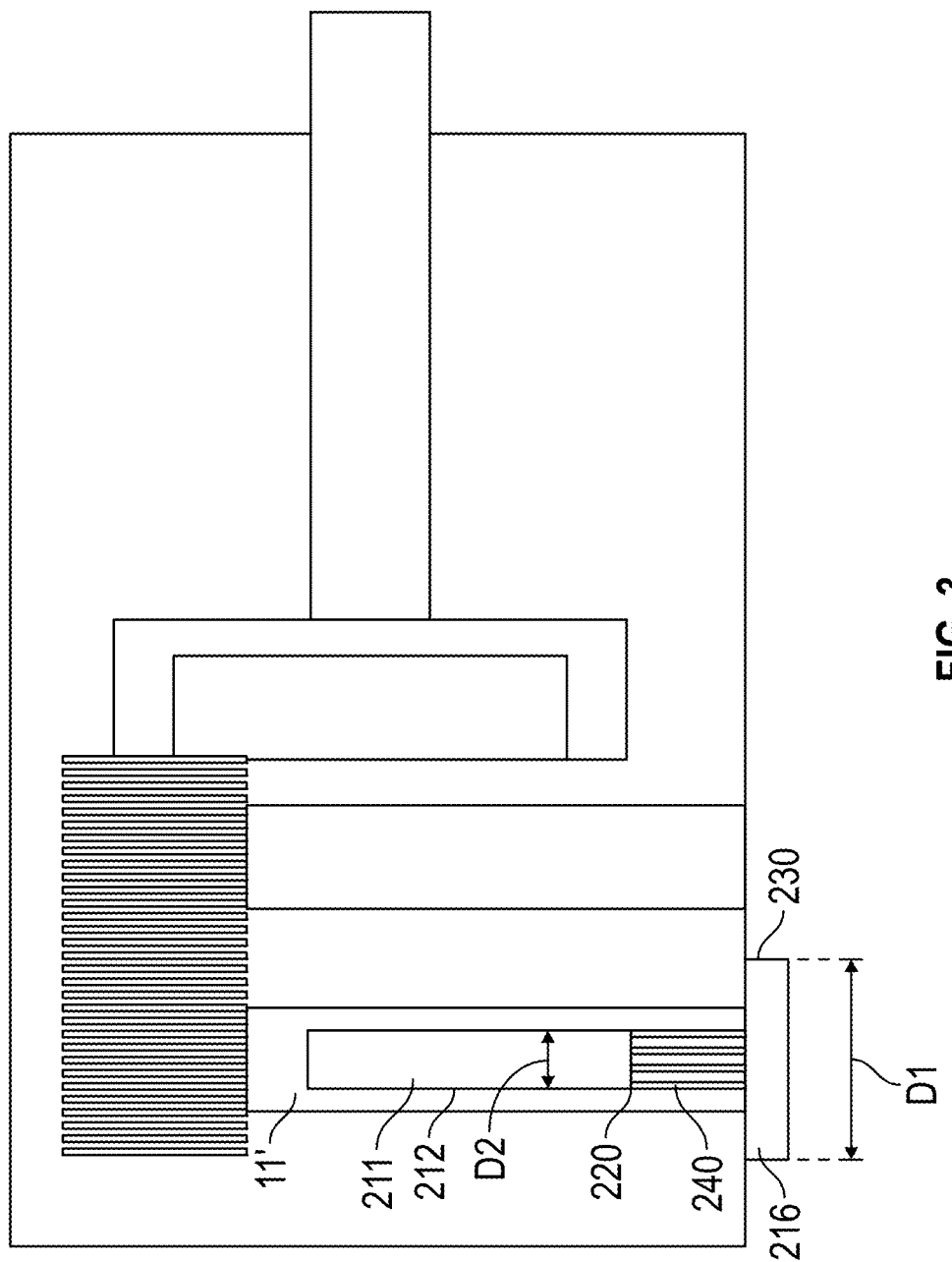
FIG. 3 depicts the thrust reverser of FIG. 2 wherein the thrust reverser and therefore actuator is locked

In the example shown in FIGS. 2 and 3, the means for locking 216 may comprise a component having a first end 220 and an opposite second end 230 with a shaft 240 extending there between. The locking means/end cap 216 may be reversible in that, when positioned in a first configuration such as that shown in FIG. 2, the end or surface 220 that is in contact with the drive spline 11' is shaped and sized to match/mirror the shape of the drive spline 11' of the thrust reverser 200 over which it is positioned, to sufficiently cover the drive spline 11' so that the locking means/end cap 216 acts as a cover to protect the drive spline 11' from environmental factors. This is depicted in FIG. 2, wherein the locking means 216 is not activated and is merely being used as an end cap.

As can be seen in FIG. 3, when the thrust reverser 200 needs to be locked, e.g. when the device is undergoing maintenance, the user would remove the end cap/locking means 216 from its position relative to the drive spline 11' as shown in FIG. 2 and would use the opposite end 230 of the locking means 216 in a second configuration, to engage with the drive spline 11' of the thrust reverser 200 to thereby lock movement of the spline 11' and therefore the actuator 11 connected to the spline 11'.

As can be seen in FIG. 3, the end 220 of the locking means 216 that acts as an end cap may in some examples therefore have a greater diameter D1 than the diameter D2 of the opposite end 230 which causes locking. This means that when used as an end cap, the drive spline is well covered, but when used as a locking means 216, the shaft 240 of the locking means 216 can be inserted into the drive spline 11' to thereby engage with and lock the spline 11' in place.

In greater detail, the drive spline 11' may be described as having a hollow shaft 211 that provides a female drive form whereas the shaft 240 of the locking means 216 provides a male shaft 240 that has a correspondingly shaped and sized outer surface. In some examples, the internal surface 212 of the of the hollow shaft 211 of the drive spline 11' may have a unique surface contour and shape that provides a bespoke interface that matches and mates with a correspondingly contoured and shaped outer surface of the shaft 240 of the locking means 216. The bespoke interface between these correspondingly contoured surfaces (i.e. the inner surface 212 of the spline 11' and the outer surface 241 of the shaft 240 of the locking means 216) are thereby able to lock the transmission and prevent movement.

Although in the examples shown in FIGS. 2 and 3 the locking means/end cap 216 is reversible to provide both functions of end cap and locking means, in some examples, these may be separate and distinct components.

Figure 4:
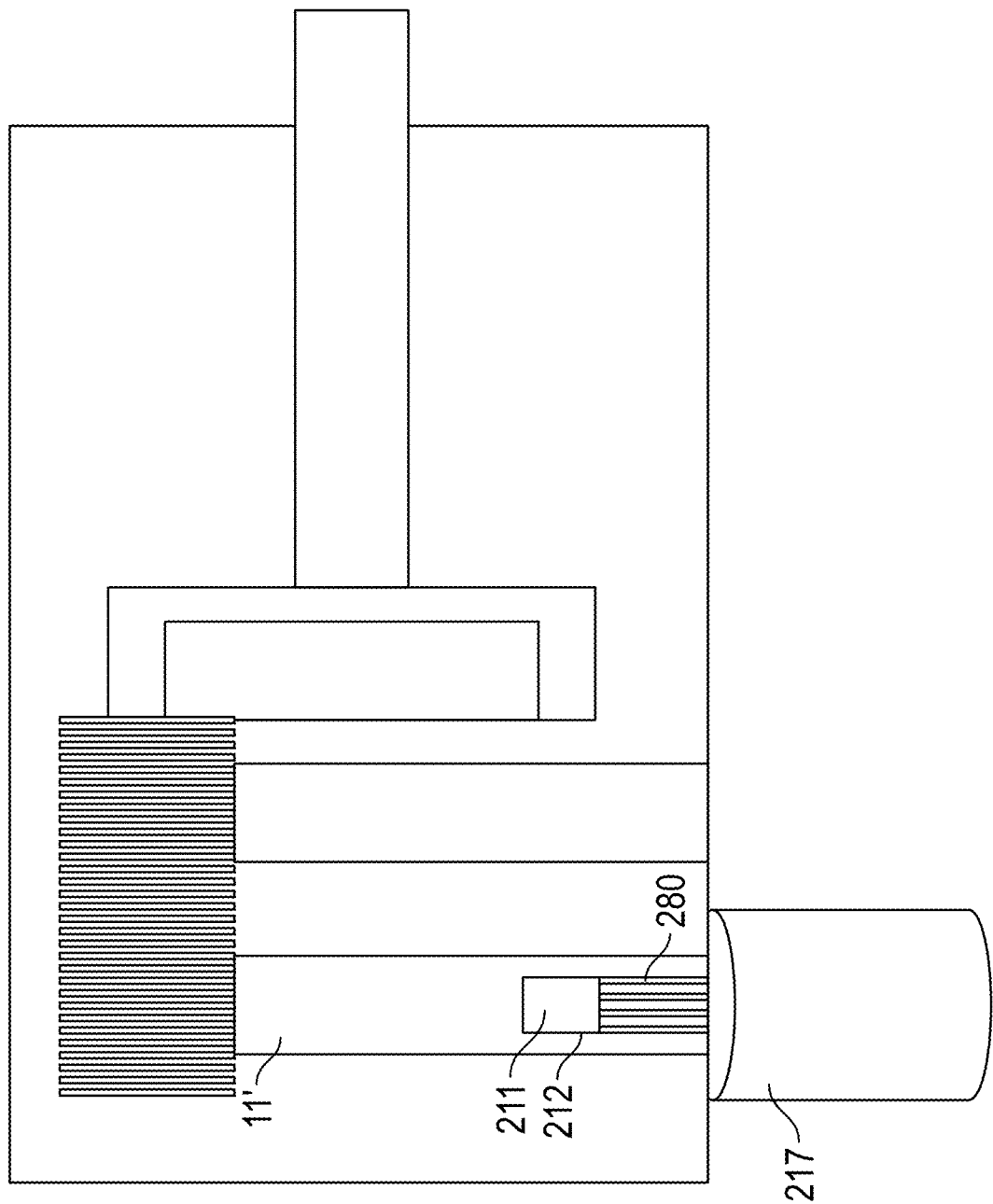
FIG. 4 depicts the thrust reverser of FIGS. 2 and/or 3 wherein a torque limiter is applied to the thrust reverser.

In any of the examples described herein, the improved thrust reverser 200 may further comprise a manual drive 217. This is depicted in use in FIG. 4. The manual drive unit 217 also acts as a torque limiter/controller. In use, the end cap 216 as shown in FIG. 2 is first removed from the entrance to the hollow shaft 211 of the spline 11'. The manual drive unit (and torque limiter/controller) 217 may also have a male section 280 comprising a shaft which has an outer surface that is also contoured and shaped so as to correspond to the contour and shape of the inner surface 212 of the spline 11'. This shaft 280 is therefore inserted into the hollow shaft 211 of the spline 11' as shown in FIG. 4 and acts as a torque limiter/controller. This may further be manually adjusted.

As is described above, in these examples either or both of the manual drive unit 217 and the locking means 216 are removable. They may also comprise a uniquely contoured and/or shaped outer surface that acts as a bespoke interface with the inner surface 212 of the spline 11' into which they are received. In some examples, the outer surface of the shafts 240, 280 of the locking means 216 and/or manual drive unit 217 may have longitudinally extending ridges, similar to those found on a traditional "lemon squeezer" device.

It has been found that providing improved thrust reversers 200 such as those described above with reference to FIGS. 2 to 4 results in a weight saving of approximately 1.2% and with a thrust reverser actuator system (TRAS) cost saving of approximately 2.5%.

The invention claimed is:

1. An actuator and a removable locking device for preventing movement of said actuator,
   said actuator comprising a drive spline for moving said actuator, said drive spline having a hollow shaft with an inner surface; and
   said locking device comprising a first end and a second end with a shaft having an outer surface extending between said first and second ends:
   wherein said inner surface of said hollow shaft of said drive spline is sized and shaped to receive and mate with said outer surface of said shaft of said removable locking device to thereby prevent movement of said actuator when said shaft of said locking device is positioned within said hollow shaft of said drive spline;
   wherein said removable locking device has a greater diameter D1 at said second end than a diameter D2 at said first end; and wherein said second end seals an entrance to said hollow shaft of said drive spline when said second end is positioned over the entrance to said hollow shaft and when said shaft of said locking device is not positioned within said hollow shaft;
   wherein the locking device is reversible to further provide the function of an end cap over the entrance to said hollow shaft.

2. The actuator and removable locking device of claim 1, wherein said inner surface of said drive spline hollow shaft and said outer surface of said shaft of said locking device are correspondingly contoured to provide a matching interface between said hollow shaft and said shaft of said locking device.

3. The actuator and removable locking device of claim 1, wherein said inner surface of said drive spline hollow shaft and said outer surface of said shaft of said locking device comprise correspondingly shaped and sized elongated ridges.

4. The actuator and removable locking device of claim 1, further comprising:
   a removable torque limiting device for limiting torque to said actuator, said torque limiting device having a shaft extending therefrom, said shaft of said torque limiting device having an outer surface;
   wherein said hollow shaft of said drive spline is sized and shaped to receive and mate with said shaft of said removable torque limiting device to thereby limit torque of said actuator.

5. The actuator and removable locking device of claim 4, wherein said inner surface of said drive spline hollow shaft and said outer surface of said shaft of said torque limiting device are correspondingly contoured to provide a matching interface between said drive spline hollow shaft and said shaft of said torque limiting device.

6. The actuator and removable locking device of claim 4, wherein said inner surface of said drive spline hollow shaft and said outer surface of said shaft of said torque limiting device comprise correspondingly shaped and sized elongated ridges.

7. A method for locking and preventing movement of an actuator, said actuator comprising a drive spline for moving said actuator, said drive spline having a hollow shaft with an inner surface, said method comprising:
   providing a removable locking device, said locking device comprising a first end and a second end with a shaft having an outer surface extending between said first and second ends; and
   inserting said shaft of the removable locking device at said first end of the removable locking device into said hollow shaft of said drive spline;
   said hollow shaft being sized and shaped to receive and mate with said shaft of said removable locking device to thereby prevent movement of said actuator;
   wherein said removable locking device has a greater diameter D1 at said second end than a diameter D2 at said first end; and wherein said second end seals an entrance to said hollow shaft of said drive spline when said second end is positioned over the entrance to said hollow shaft and when said shaft of said locking device is not positioned within said hollow shaft;
   wherein the locking device is reversible to further provide the function of an end cap over the entrance to said hollow shaft.

8. The method for locking and preventing movement of an actuator of claim 7, further comprising:
   providing a removable torque limiting device comprising a shaft extending therefrom, said shaft of said removable torque limiting device having an outer surface;
   inserting said shaft of said torque limiting device into said hollow shaft of said drive spline;
   wherein said hollow shaft is sized and shaped to receive and mate with said shaft of said torque limiting device to thereby limit torque of said actuator.

* * * * *